(12) United States Patent
Vinardi et al.

(10) Patent No.: US 11,986,762 B2
(45) Date of Patent: May 21, 2024

(54) FIBERGLASS PRODUCT FOR A FILTER APPARATUS

(71) Applicant: American Air Filter Company, Inc., Louisville, KY (US)

(72) Inventors: Alejandro Vinardi, Fayetteville, AR (US); Matthew Shaffer, Louisville, KY (US); William Barrows, Jeffersonville, IN (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 253 days.

(21) Appl. No.: 17/187,224

(22) Filed: Feb. 26, 2021

(65) Prior Publication Data

US 2021/0275958 A1    Sep. 9, 2021

Related U.S. Application Data

(60) Provisional application No. 62/984,619, filed on Mar. 3, 2020.

(51) Int. Cl.
| | |
|---|---|
| *B01D 29/11* | (2006.01) |
| *B01D 39/20* | (2006.01) |
| *B01D 46/00* | (2022.01) |
| *B01D 46/06* | (2006.01) |

(52) U.S. Cl.
CPC .............. *B01D 46/06* (2013.01); *B01D 29/11* (2013.01); *B01D 39/2003* (2013.01); *B01D 39/2017* (2013.01); *B01D 46/0005* (2013.01); *B01D 2239/0681* (2013.01); *B01D 2275/10* (2013.01)

(58) Field of Classification Search
CPC ................ B01D 46/06; B01D 46/0005; B01D 2239/0681; B01D 2275/10; B01D 29/11; B01D 39/2003; B01D 39/2017
USPC ............................................ 55/495; 428/222
See application file for complete search history.

(56) References Cited

U.S. PATENT DOCUMENTS

| | | | |
|---|---|---|---|
| 5,667,544 A * | 9/1997 | Haas .......................... | B32B 5/26 55/DIG. 12 |
| 8,057,566 B1 * | 11/2011 | Sanders ................. | B01D 46/10 55/486 |
| 8,393,180 B1 | 3/2013 | Sanders et al. | |
| 9,527,025 B1 | 12/2016 | Sanders et al. | |

FOREIGN PATENT DOCUMENTS

JP         2007046744 A  *  2/2007

* cited by examiner

*Primary Examiner* — Robert A Hopkins
(74) *Attorney, Agent, or Firm* — Gray Ice Higdon

(57) ABSTRACT

In the description and drawings a fiberglass product is disclosed. The fiberglass product may have one or more fiber curl layers. The fiber curl layers may have a plurality of generally sinusoidal fiber bundles therein.

19 Claims, 6 Drawing Sheets

FIBERGLASS PRODUCT FOR A FILTER APPARATUS

TECHNICAL FIELD

The embodiments pertain to a fiberglass product, and more particularly, various inventive apparatuses described herein relate to a fiberglass product for a tilter apparatus.

SUMMARY

In some embodiments, a fiberglass product may include at least one of a first fiber curl layer, a second fiber curl layer, and a fiberglass backing layer. In various embodiments, the first fiber curl layer may be on the upstream air entry side. In some embodiments, the fiber curl layer may have a plurality of fiber curl first fibers and have a substantially constant first density. Moreover, in various embodiments, the fiberglass backing layer may be on the downstream air exit side opposite the air entry side. In some embodiments, the fiberglass backing layer may include a plurality of third fibers. In various embodiments, the second fiber curl layer may be positioned between the first fiber curl layer and the fiberglass backing layer. In some embodiments, the second fiber curl layer may include a plurality of fiber curl second fibers and have a substantially constant second density.

In addition, in various embodiments, the fiberglass product may be used in a bag type filter apparatus. In some embodiments, the first fiber may include an amplitude from about 0.25 inches up to about 0.625 inches. In various embodiments, the first fiber may include a curl length of about 1.5 inches peak-to-peak. In some embodiments, the third fiber may include a diameter of about 22 to about 40 microns. Moreover, in various embodiments, the third fiber includes the diameter of about 28 to about 32 microns. In some embodiments, the second fiber may include an amplitude from about 0.25 inches up to about 0.375 inches. In various embodiments, the second fiber may include a curl length of about 0.5 inches to about 0.75 inches peak-to-peak. In some embodiments, the second fiber may include a diameter of about 22 to about 40 microns. In various embodiments, the second fiber may include the diameter of about 28 to about 32 microns. In addition, in some embodiments, the first fiber curl layer, the second fiber curl layer, and the fiberglass backing layer may be impregnated with an adhesive gel. In various embodiments, the first fiber curl layer may be 55.4% by weight of the adhesive gel. In some embodiments, the second fiber curl layer may be 57.4% by weight of the adhesive gel. Moreover, in various embodiments, the fiberglass backing layer may be 56% by weight of the adhesive gel. In some embodiments, at least one of the second fiber curl layer, the first fiber curl layer, and the fiberglass backing layer may include at least one skin layer on an upstream side and/or downstream side thereof. In various embodiments, the first fiber curl layer and the second fiber curl layer each have a plurality of sinusoidal fiber bundles. In some embodiments, the plurality of sinusoidal fiber bundles of each one of the first fiber curl layer and the second fiber curl layer are a majority of the plurality of fiber curl first fibers and the plurality of fiber curl second fibers, respectively. In some embodiments, the plurality of third fibers of the fiberglass backing layer may be a majority of individual fibers and a minority of a plurality of third fiber bundles. In various embodiments, a first compression strength of the first fiber curl layer may be larger than a second compression strength of the second fiber curl layer.

In various embodiments, a bag type filter apparatus may include at least one of a first upstream fiber curl layer, a downstream fiberglass backing layer, and a second upstream fiber curl layer. In some embodiments, the first upstream fiber curl layer may have a plurality of generally sinusoidal first fiber bundles and individual first fibers. In various embodiments, the downstream fiberglass backing layer may have a plurality of third fiber bundles and individual third fibers. In some embodiments, the second upstream fiber curl layer may have a plurality of generally sinusoidal second fiber bundles and individual second fibers positioned between the first upstream fiber curl layer and the downstream fiberglass backing layer. In addition, in various embodiments, a percentage of the individual first, second, and third fibers of each one of the layers, respectively, may increase in the direction of air flow. In some embodiments, a percentage of the first, second, and third fiber bundles of each one of the first, second, and third layers, respectively, decreases in the direction of air flow.

In addition, in some embodiments, the downstream fiberglass backing layer may have a thickness of about 0.5 inches and each one of the first upstream fiber curl layer and the second upstream fiber curl layer may have a thickness of about 4 inches. In various embodiments, each one of the layers maybe impregnated with an adhesive gel. In some embodiments, a first fiber curl of the first upstream fiber curl layer may include an amplitude from about 0.25 inches up to about 0.625 inches and a curl length of about 1.5 inches peak-to-peak. In various embodiments, a second fiber curl of the second upstream fiber curl layer may include an amplitude from about 0.25 inches up to about 0.375 inches and a curl length of about 0.5 inches to about 0.75 inches peak-to-peak. Moreover, in some embodiments, a first compression strength of the first upstream fiber curl layer may be larger than a second compression strength of the second upstream fiber curl layer.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
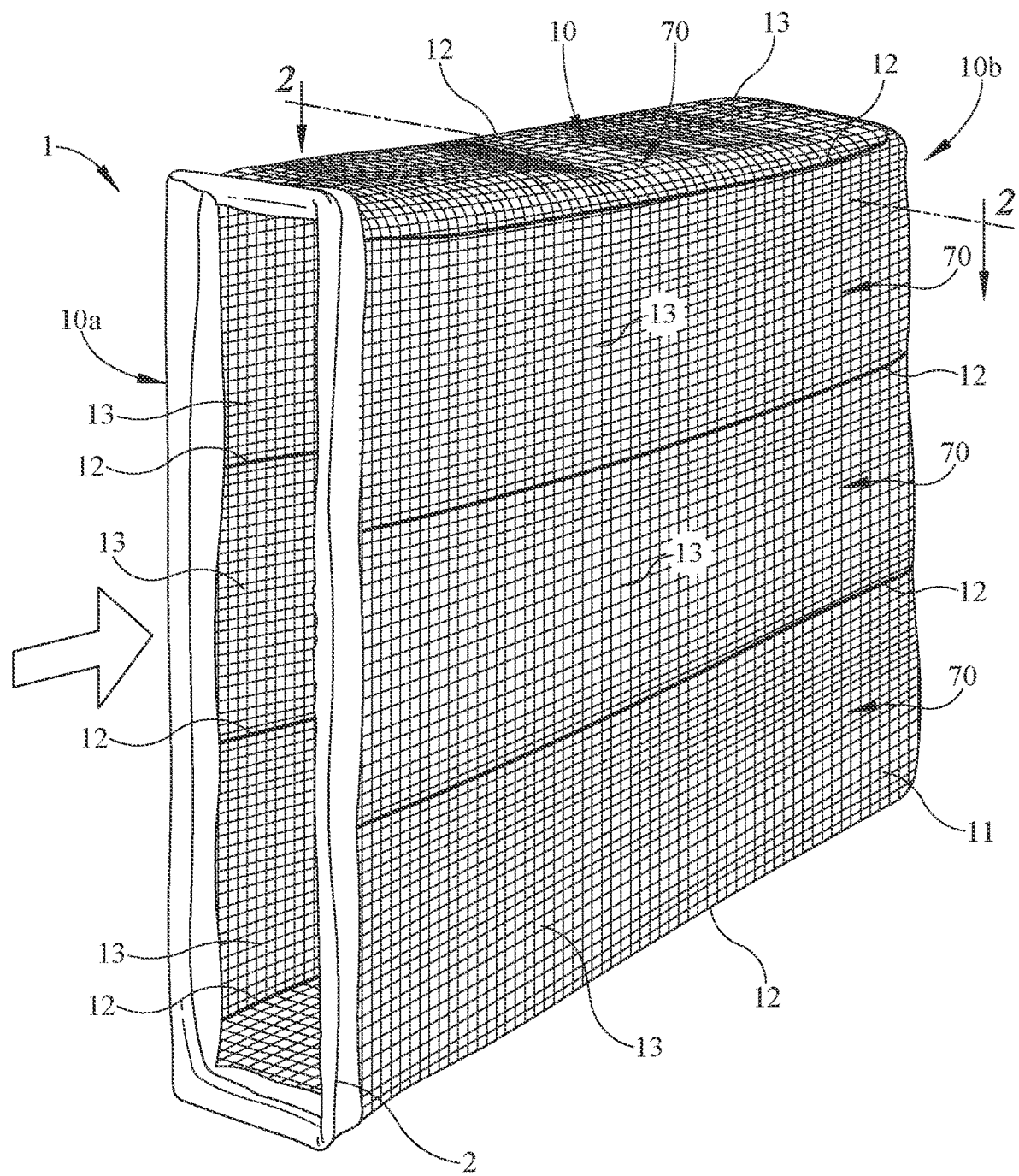
FIG. 1 is a perspective view of one embodiment of the filter apparatus using an embodiment of the fiberglass product.

Numerous variations and modifications will be apparent to one of ordinary skill in the art, as will become apparent from the description below. Therefore, the invention is not limited to the specific implementations discussed herein.

Referring to Figures of the drawings, a fiberglass filter product/media 10 may be assembled as a filter apparatus 1. In these Figures, one embodiment of the filter media 10 arrangement may be used and assembled in preselected layered form, folded into facing sections and stitched along spaced longitudinally extending seams to form an open mouth bag or pocket type unit filter 1 of an arrangement particularly useful, but is not limited to, on engine intakes of diesel locomotives. It is to be understood that many of the features are not be to be considered as limited to the particular bag type unit filter or portions thereof as disclosed but that other forms of filter units (e.g. marine filtration, cartridge filters, media pads/mats, replaceable media pads, etc.) can be constructed to incorporate many of the novel features of the inventive arrangement disclosed herein. Moreover, the fiberglass product (e.g. 20, 30, 40, 1, and/or 10) may include the filter apparatus, or portions thereof such as the one or more fiberglass layers.

Referring particularly to FIGS. 1-4 of the drawings, the assembled layered filter media 10 is disclosed. One or more layers (e.g. fiber curl layers 20, 30, scrim 11, skins 50/80/90, and/or backing layer 40, etc.) of the filter media 10 may, but is not limited to, an increase in dirt holding capacity, target final pressure drop, reduced percentage of sloughing dirt loss at end of filter life cycle, and/or may lower the filter apparatus/media operating pressure during the useful operating life. In some embodiments, the filter media or fiberglass mat 10 of FIG. 1, or portions thereof, may be composed of one or more fiber curl layers or filter media sheets 20 and 30 each having a monolithic constant density (e.g. in the thickness or Z direction/dimension), expansible-compressible, moisture resistant spun fiberglass. The one or more fiber curl layers 20, 30 may include a more uniform open characteristic/fibers, may have bundled/single fibers, and/or maintain a Z direction (compression) strength to oppose the differential (e.g. entering side to exiting side) air forces passing through the curl fiber layer and/or filter apparatus/media.

A First Fiber Curl Layer or Fiberglass Product

In some implementations, the fiberglass mat 10 and/or fiberglass product 1 may include at least the fiber curl layer 20. The fiber curl layer 20 may be relatively open with a substantially uniform density and have a number of fibers consistently bundled together to provide rigidity for structural support. The fiber bundles 24 and fibers 22 may be in a generally sinusoidal arrangement when the fiberglass product is created, providing structural support and rigidity along with filtering capacity.

Referring to FIGS. 2-5, a portion of an embodiment of a fiberglass product 1 or mat 10 will be described in detail. The fiberglass product 10 or fiber curl layer 20 is ready for use by an end user (e.g. cut from a drum, subsequently expanded, cured, and/or cut to a predetermined desired size). For example, the fiberglass mat/product 10 or fiber curl layer 20 may be cut to a predetermined size and used as is or in a variety of fiberglass products/apparatuses 1.

The fiber curl layer 20 may in some embodiments be approximately about 30 to about 40 grams per square foot (gsf) for dry fiberglass basis weight. In some embodiments the material make-up of the fiber curl layer 20 or portion of the fiberglass product 1, 10 may be approximately 55.4% adhesive gel and approximately 44.6% glass fiber (e.g. soda lime glass type). In some embodiments, the fiber curl layer 20 may be approximately 4" thick.

Figure 4:
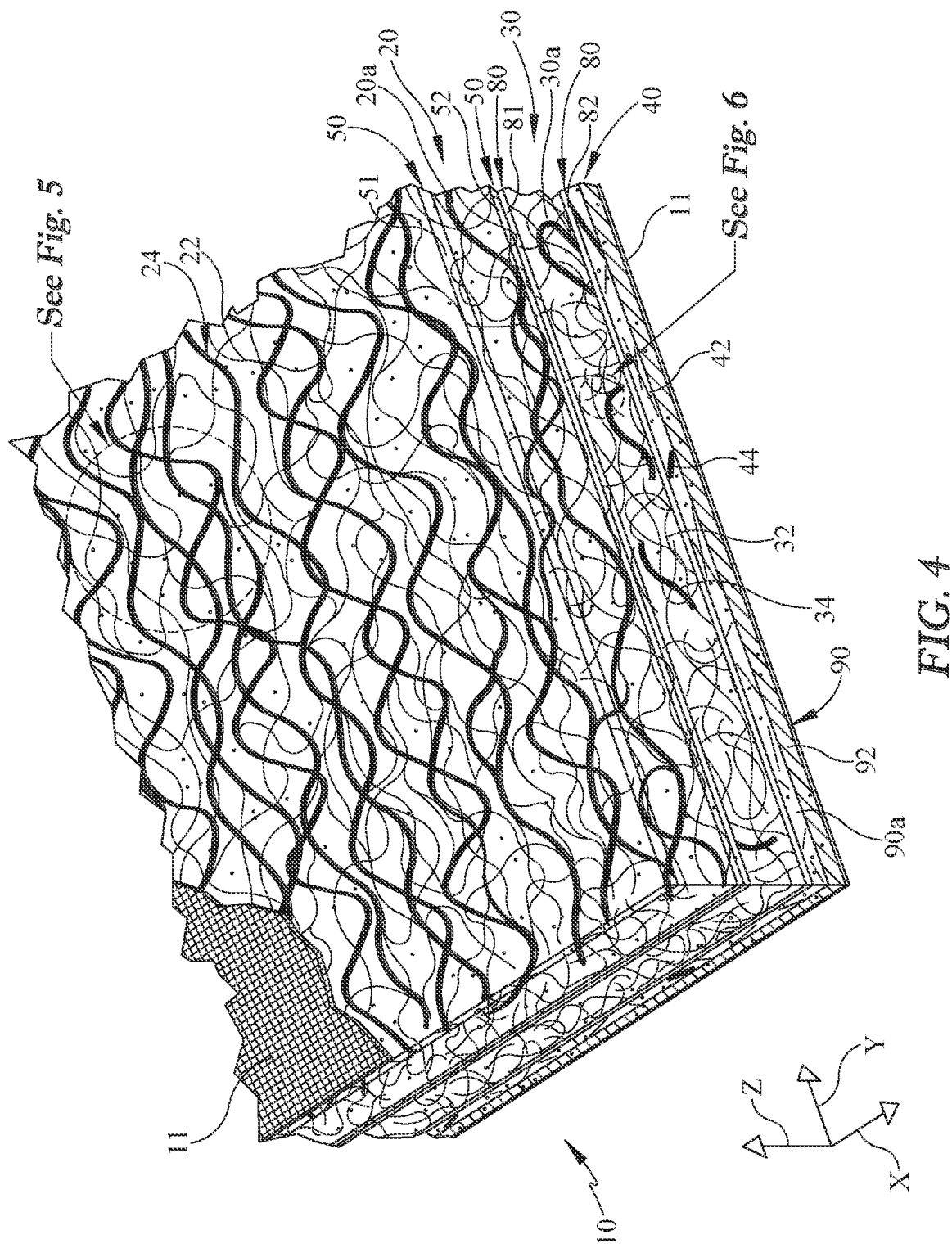
FIG. 4 is a top perspective view of the embodiment of the multi-layered fiberglass product of FIG. 3.
Figure 5:
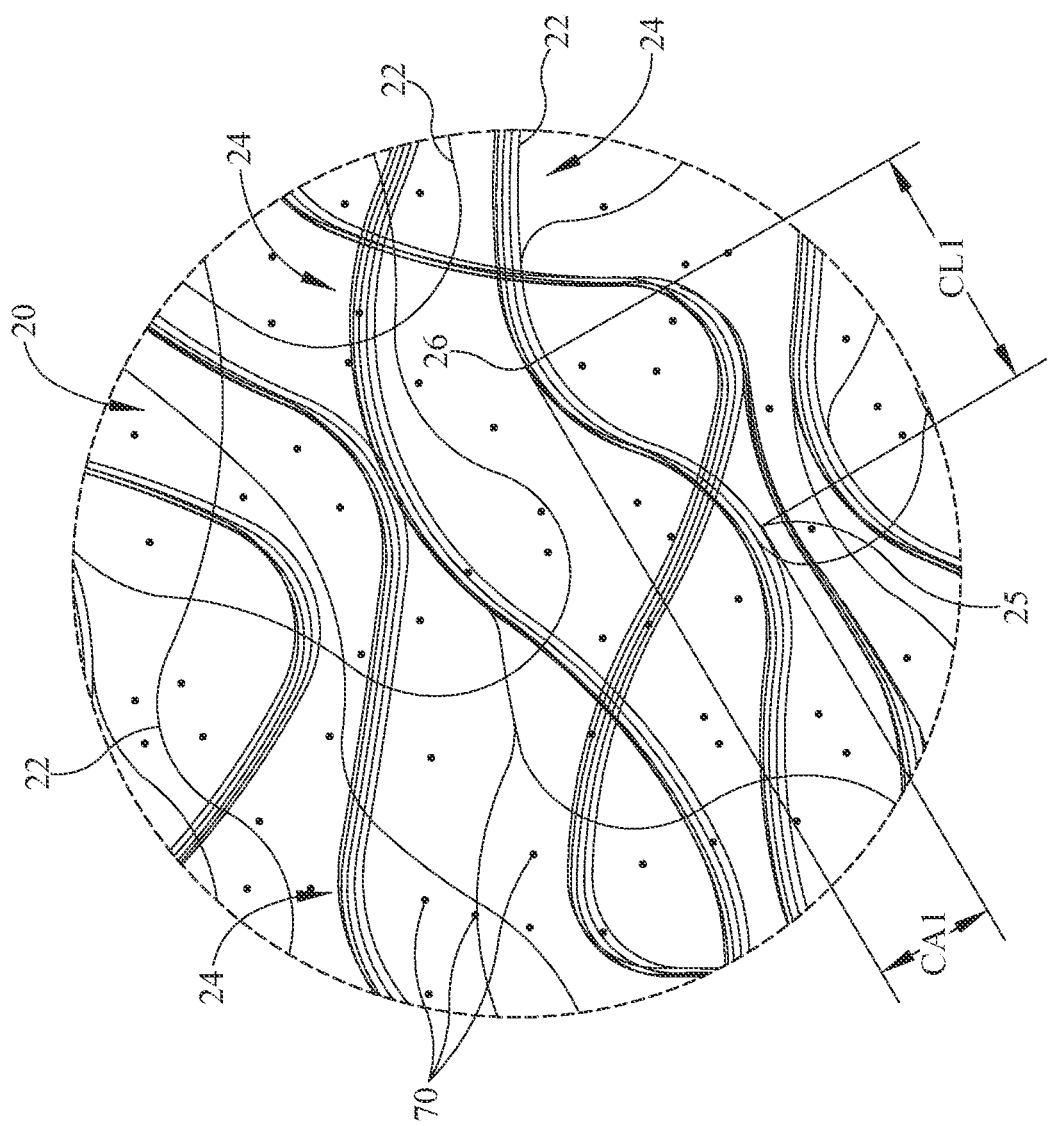
FIG. 5 is a close-up top view of the embodiment of the first fiber curl layer of embodiment as shown in FIG. 4.

Referring particularly to FIGS. 4 and 5, which shows a close up of a portion of the fiber curl layer 20 depicted, the fiber curl layer 20 comprises a plurality of individual fibers 22 and fiber bundles 24 that are disposed in a generally sinusoidal pattern. In some embodiments, the individual fibers 22 within the fiber curl layer 20 may each have an average fiber diameter of approximately 30 microns. A single of the individual fibers 22 may form part of a plurality of distinct fiber bundles 24. Each of the individual fibers 22 may, at one or more locations, be bundled with one or more other individual fibers 22 to thereby form fiber bundles 24. Each of the fiber bundles 24 may comprise from two to two thousand individual fibers 22. Each of the fiber bundles 24 have a diameter that corresponds to a circle most closely conforming thereto. In some embodiments, the fiberglass product 10 or fiber curl layer 20 may comprise a plurality of fiber bundles 24 (e.g. with the same or different fiber count). In some embodiments, the fiberglass product 10 or fiber curl layer 20 may include a plurality of fiber bundles and individual fibers. In some implementations of the product 1 (e.g. fiberglass mat 10) or fiber curl layer 20, 80% of the fiber bundles may be about 10 to about 30 fibers, 10% fiber bundles of about 5 to about 10 fibers, and 10% as individual fibers.

The individual fiber bundles 24 and/or individual fiber 22 may have at least one curl length. Each curl length is the horizontal two dimensional linear distance between two immediately adjacent minimum and maximum points of an individual of fiber bundles 24 or fiber 22 (e.g. peak-to-peak). An exemplary curl length CL1 is indicated in FIG. 5 extending between two immediately adjacent minimum and maximum points 25 and 26 of an individual of fiber bundles 24. In some embodiments the fiberglass product 10 or fiber curl layer 20 may comprise a plurality of fiber bundles 24 and/or fibers 22 each having one or more curl length, In some embodiments, the fiberglass product 10 or fiber curl layer 20 may comprise a plurality of fiber bundles 24 and/or fibers 22, wherein the curl length CL1 is about 1.5 inches.

The individual fiber bundles 24 and/or fiber 22 may have at least one curl amplitude. Each curl amplitude is the vertical linear distance between two immediately adjacent minimum and maximum points of an individual of fiber bundles 24 and/or fiber 22. An exemplary curl amplitude CA1 is indicated in FIG. 5 extending between two immediately adjacent minimum and maximum points 25 and 26 of an individual of fiber bundles 24. In some embodiments, the fiberglass product 10 or fiber curl layer 20 may comprise a plurality of fiber bundles 24 and/or fibers 22 each having at least one curl amplitude, wherein the fiber bundles 24 and/or fibers 22 have a curl amplitude range from about 0.25 inches to about 0.625 inches.

In some implementations, the fiber curl layer 20 or fiberglass product 10 may include one or more skin layers 50. The skin layer 50 may be used for handling integrity for the fiber curl layer 20 (e.g. un-lofted fiber orientated in the X-Y dimension). The one or more skin layers 50, may be connected/formed to the upstream side and/or downstream side of the fiber curl layer 20. In the one embodiment shown, a skin layer 50 is positioned on each one of the upstream side and downstream side of the fiber curl layer 20. A first skin layer 51 may be positioned on the upstream side and a second skin layer 52 may be positioned on the downstream side. The skin layer, if used in some embodiments, may each be about 0.4% (0.8% total for both skin layers) of the fiber curl layer 20 or glass mat weight of the about 30 to about 40 grams per square foot of one embodiment or the fiberglass product. Therefore, in some embodiments, the center or middle 20a of the fiber curl layer 20, if the opposing skins 51, 52 are used, includes about 99.2% of the total mat/pad weight and the substantially uniform density structure of the fiberglass product.

In some implementations, the fiber curl layer or fiberglass product 20 may be impregnated with an adhesive gel 70. The fiber curl layer 20 and one or more skins 50, if used, may be impregnated with the gel or resin 70. The gel 70 may be uniformly impregnated in the Z-direction/dimension or direction of airflow. In some embodiments, the fiber curl layer 20 may be impregnated up to 60% weight (e.g. total maximum 43.4 grams/SF of gel.) of a variety of gels, if used. In some embodiments, the adhesive gel 70 may be a gelled isopropyl triphenyl phosphate fluid (PIP 3:1). Other gels may be used and still be within the scope of the invention. For example, a variety of gels may be used that self-extinguish to flame exposure on fiberglass (e.g. isobutyl triphenyl phosphate ester, SANTICIZER 154, formulated self-extinguishing gelled silicone fluids, etc.). In use, the gel may slowly leak the fluid out of the gel over time. This process may be called syneresis, so that captured dry dirt may become wetted as more fresh dry dirt accumulates over the useful operating life of the filter mat or fiberglass product. The wetting of dirt may increase the total dirt holding capacity of the filter as opposed to a non-wicking adhesive such as pressure sensitive adhesive. It should be understood, that a non-wicking adhesive may be used in some embodiments. The syneresis or leaked fluid may also hold onto dirt during the sloughing test were a filter at the end of its life (e.g. filled with dirt) is vibrated in pulses to simulate actual operating conditions. In some embodiments, the product or fiber curl layer 20 with gel, if used, may be as low as about 0.05% by weight maximum of total dirt of the captured dirt to fall from the dirty filter.

In some embodiments, the fiber curl layer 20 may include compression strength in the thickness or Z direction/dimension of the layer or mat. In the one embodiment shown, the compressive strength of the 4 inch thick layer averages about 1,520 grams per square foot when compressing the 4 inch pad down 2.5 inch thickness as the end point. In some embodiments, the fiber curl layer 20 may have about the minimum compression strength of around 776 grams per square foot.

A Second Fiber Curl Layer or Fiberglass Product

In some implementations, the fiberglass mat 10 or fiberglass product 1 may include at least the fiber curl layer 30. The fiber curl layer 30 may be relatively open with a substantially uniform density and have a number of fibers consistently bundled together to provide rigidity for structural support. The fiber bundles 34 and fibers 32 may be in a generally sinusoidal arrangement when the fiberglass product is created, providing structural support and rigidity along with filtering capacity.

Referring to FIGS. 2-4 and 6, a portion of an embodiment of a fiberglass product 1 or mat 10 will be described in detail. The fiberglass product 10 or fiber curl layer 30 is ready for use by an end user (e.g. cut from a drum, subsequently expanded, cured, and/or cut to a predetermined desired size). For example, the fiberglass mat/product 10 or fiber curl layer 30 may be cut to a predetermined size and used as is or in a variety of fiberglass products/apparatuses 1.

The fiber curl layer 30 may in some embodiments be approximately about 27.2 to about 37.2 grams per square foot (gsf) for dry fiberglass basis weight. In some embodiments the material make-up of the fiber curl layer 20 or portion of the fiberglass product 1, 10 may be approximately 57.4% adhesive gel and approximately 43.6% glass fiber (e.g. soda lime glass type). In some embodiments, the fiber curl layer 30 may be approximately 4" thick.

Figure 6:
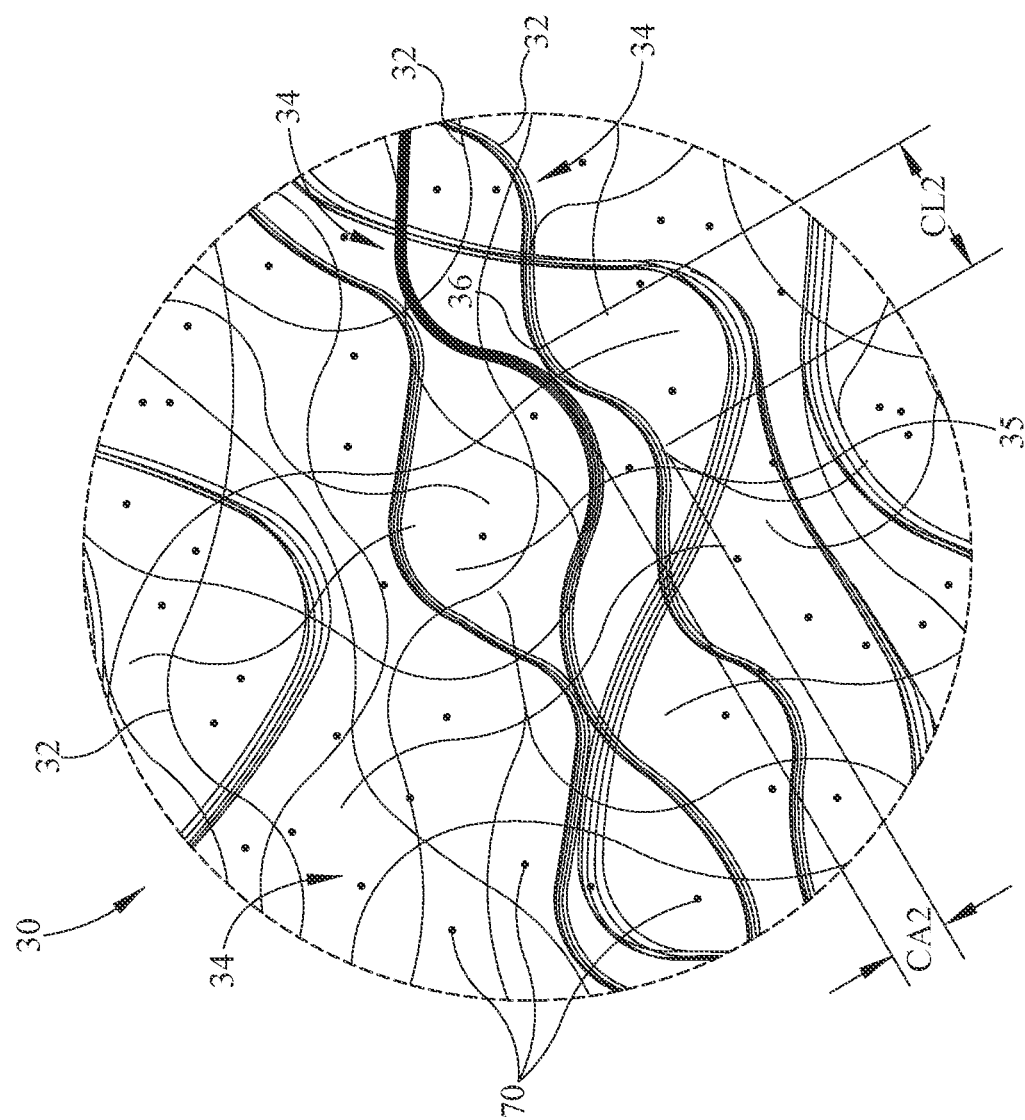
FIG. 6 is a close-up top view of the embodiment of the second fiber curl layer of embodiment as shown in FIG. 4.

Referring particularly to FIGS. 4 and 6, which shows a close up of a portion of the fiber curl layer 30 depicted, the fiber curl layer 30 comprises a plurality of individual fibers 32 and fiber bundles 34 that are disposed in a generally sinusoidal pattern. In some embodiments, the individual fibers 32 within the fiber curl layer 30 may each have an average fiber diameter of approximately 30 microns. In some embodiments, the fiber diameter may be within in a range of about 22 to about 40 micron. In various embodiments, the range may be about 28 to about 32 microns. A single of the individual fibers 32 may form part of a plurality of distinct fiber bundles 34. Each of the individual fibers 32 may, at one or more locations, be bundled with one or more other individual fibers 32 to thereby form fiber bundles 34. Each of the fiber bundles 34 may comprise from two to two thousand individual fibers 32. Each of the fiber bundles 34 have a diameter that corresponds to a circle most closely conforming thereto. In some embodiments, the fiberglass product 10 or fiber curl layer 30 may comprise a plurality of fiber bundles 34 (e.g. with the same or different fiber count). In some embodiments, the fiberglass product 10 or fiber curl layer 30 may include a plurality of fiber bundles and individual fibers. In some implementations of the product (e.g. fiberglass mat) or fiber curl layer 30, a majority of the fiber bundles may be about 3 to about 10 fibers and a minority of fibers are individual fibers.

The individual fiber bundles 34 and/or individual fiber 32 may have at least one curl length. Each curl length is the horizontal two-dimensional linear distance between two immediately adjacent minimum and maximum points of an individual of fiber bundles 34 or fiber 32 (e.g. peak-to-peak). An exemplary curl length CL2 is indicated in FIG. 6 extending between two immediately adjacent minimum and maximum points 35 and 36 of an individual of fiber bundles 34. In some embodiments the fiberglass product 10 or fiber curl layer 30 may comprise a plurality of fiber bundles 34 and/or fibers 32 each having one or more curl length, In some embodiments, the fiberglass product 10 or fiber curl layer 30 may comprise a plurality of fiber bundles 34 and/or fibers 32, wherein the curl length CL2 is about 0.5 inches to about 0.75 inches.

The individual fiber bundles 34 and/or fiber 32 may have at least one curl amplitude. Each curl amplitude is the vertical linear distance between two immediately adjacent minimum and maximum points of an individual of fiber bundles 34 and/or fiber 32. An exemplary curl amplitude CA2 is indicated in FIG. 6 extending between two immediately adjacent minimum and maximum points 35 and 36 of an individual of fiber bundles 34. In some embodiments, the fiberglass product 10 or fiber curl layer 30 may comprise a plurality of fiber bundles 34 and/or fibers 32 each having at least one curl amplitude, wherein the fiber bundles 34 and/or fibers 32 have a curl amplitude range from about 0.25 inches to about 0.375 inches.

In some implementations, the fiber curl layer 30 or fiberglass product 10 may include one or more skin layers 80. The skin layer 80 may be used for handling integrity for the fiber curl layer 30 (e.g. un-lofted fiber orientated in the X-Y dimension). The one or more skin layers 80, may be connected/formed to the upstream side and/or downstream side of the fiber curl layer 30. In the one embodiment shown, a skin layer 80 is positioned on each one of the upstream side and downstream side of the fiber curl layer 30. A first skin layer 81 may be positioned on the upstream side and a second skin layer 82 may be positioned on the downstream side. The skin layer, if used in some embodiments, may each be about 2.1% (4.2% total for both the skin layers) of the fiber curl layer 30 or glass mat weight of the about 27.2 to about 37.2 grams per square foot of one embodiment or the fiberglass product. Therefore, in some embodiments, the center or middle 30a of the fiber curl layer 30, if the opposing skins 81, 82 are used, includes about 95.8% of the total mat/pad weight and the substantially uniform density structure of the fiberglass product.

In some implementations, the fiber curl layer or fiberglass product 30 may be impregnated with an adhesive gel 70. The fiber curl layer and one or more skins, if used, may be impregnated with the gel or resin 70. The gel 70 may be uniformly impregnated in the Z-direction/dimension or direction of airflow. In some embodiments, the fiber curl layer 30 may be impregnated up to 60% weight (e.g. total maximum 43.4 grams/SF of gel.) of a variety of gels, if used. In some embodiments, the adhesive gel may be a gelled isopropropyl triphenyl phosphate fluid (PIP 3:1). Other gels may be used and still be within the scope of the invention. For example, a variety of gels may be used that self-extinguish to flame exposure on fiberglass (e.g. isobutyl triphenyl phosphate ester, SANTICIZER 154, formulated self-extinguishing gelled silicone fluids, etc.). In use, the gel may slowly leak the fluid out of the gel over time. This process may be called syneresis, so that captured dry dirt may become wetted as more fresh dry dirt accumulates over the useful operating life of the filter mat or fiberglass product. The wetting of dirt may increase the total dirt holding capacity of the filter as opposed to a non-wicking adhesive such as pressure sensitive adhesive. It should be understood, that a non-wicking adhesive may be used in some embodiments. The syneresis or leaked fluid may also hold onto dirt during the sloughing test were a filter at the end of its life (e.g. filled with dirt) is vibrated in pulses to simulate actual operating conditions. In some embodiments, the product or fiber curl layer with gel, if used, may be as low as about 0.05% by weight maximum of total dirt of the captured dirt to fall from the dirty filter.

In some embodiments, the fiber curl layer 30 may include compression strength in the thickness or Z direction/dimension of the layer or mat. In the one embodiment shown, the compressive strength of the 4 inch thick layer averages about 900 grams per square foot when compressing the 4 inch pad down 2.5 inch thickness as the end point. In some embodiments, the fiber curl layer 30 may have about the minimum compression strength of around 776 grams per square foot.

A Third Fiberglass Layer or Fiberglass Product

In some implementations, the fiberglass mat 10 or fiberglass product 1 may include at least a fiberglass backing layer 40. The fiberglass backing layer 40 may be relatively open with a substantially uniform density, have a number of fibers consistently bundled together, and/or may retain captured dirt. In some embodiments, the fiberglass backing layer 40 may increase the capture percentage collection efficiency and/or minimize sloughing loss of captured dirt (e.g. during pulsing forces of the sloughing test).

In some implementations, the fiberglass backing layer 40 or fiberglass product 10 may include one or more skin layers 90. The skin layer 90 may be used for handling integrity for the fiberglass backing layer 40. The one or more skin layers 90, may be connected/formed to the upstream side and/or downstream side of the fiberglass backing layer 40. In the one embodiment shown, a skin layer 90 is positioned on the downstream side or air exiting side of the fiberglass backing layer 40. A first skin layer 92 may be positioned on the downstream side. In the one embodiment shown, the fiberglass backing layer 40 includes a 75% by weight skin 92 on the air-exit side and no skin layer on the upstream side or air entering side. Therefore, in some embodiments, the center or middle 90a of the fiberglass backing 90, if skin 92 is used, includes about 25% of the total mat/pad weight of the fiberglass product. However, in some embodiments if skin layers are used, the air entering side of the backing layer may include a skin layer. In the one embodiment shown, the fiberglass backing layer 40 may not include curled fibers. However, it should be understood that curl fibers may be used in some embodiments.

Figure 2:
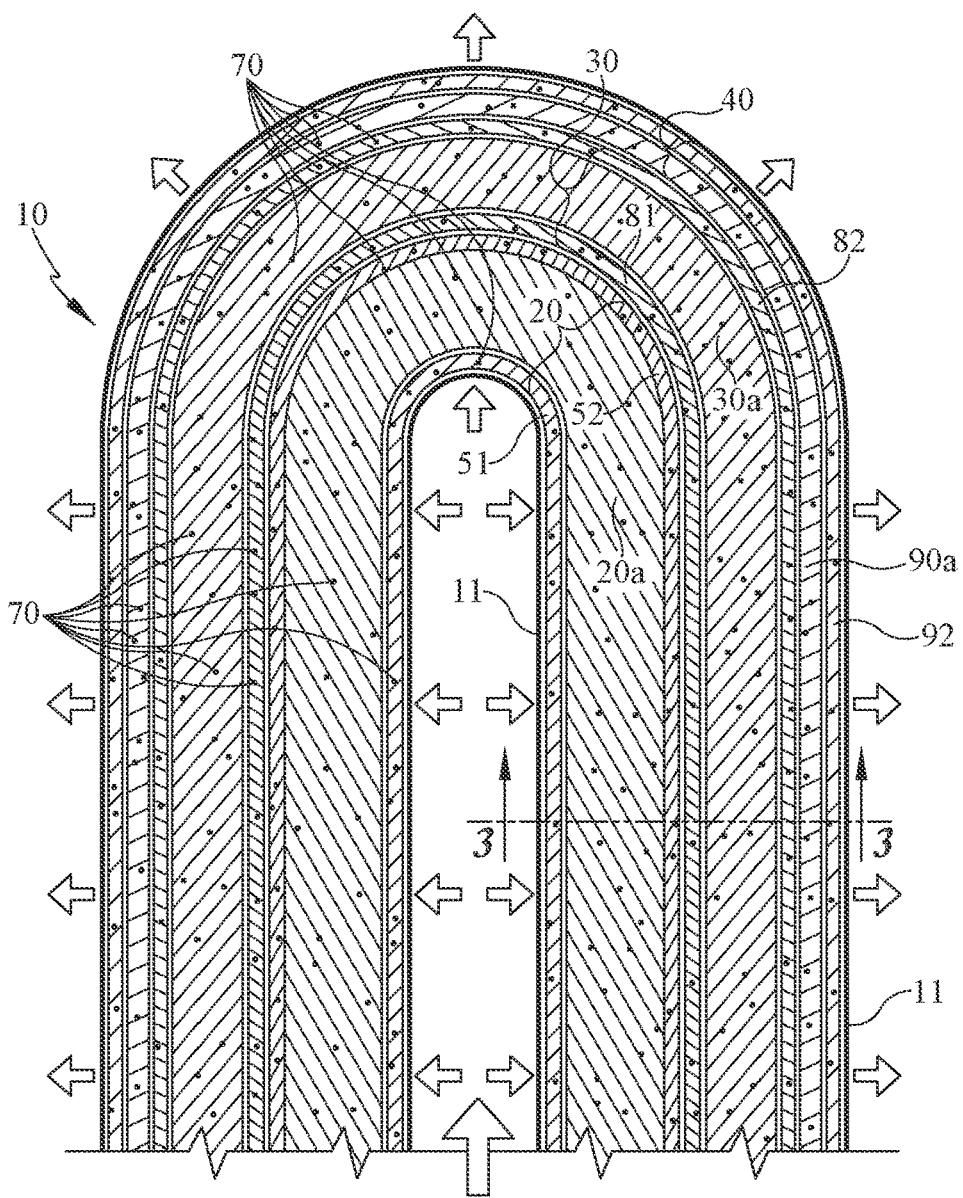
FIG. 2 is a sectional view of the fiberglass product of FIG. 1 taken along line 2-2.
Figure 3:
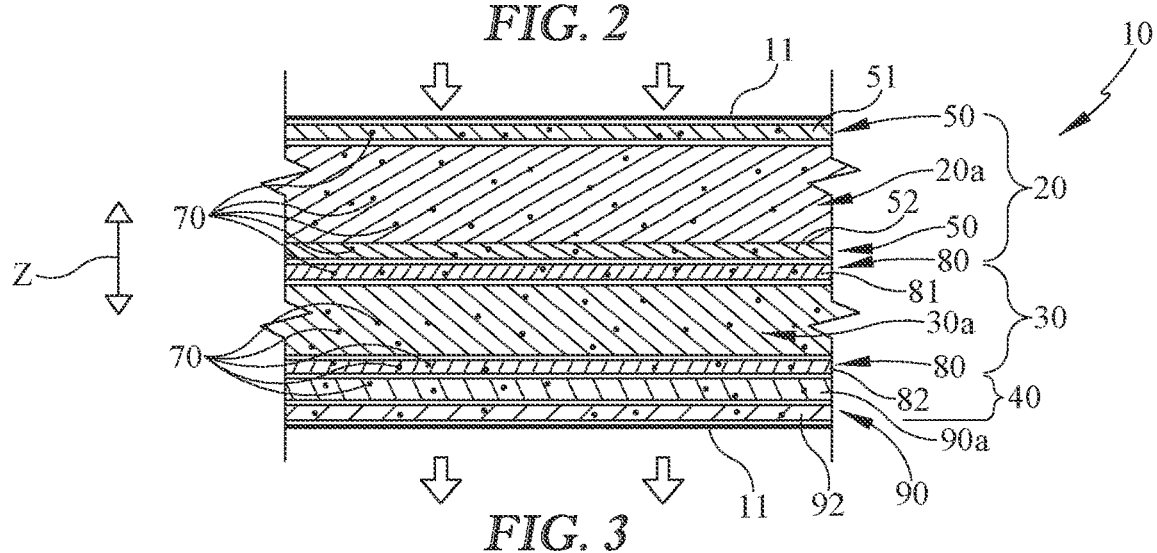
FIG. 3 is a close up sectional view of the fiberglass product of FIG. 2 taken along line 3-3.

Referring to FIGS. 2-4, a portion of an embodiment of a fiberglass product 1 or mat 10 will be described in detail. The fiberglass product 10 or fiberglass backing layer 40 is ready for use by an end user (e.g. cut from a drum, subsequently expanded, cured, and/or cut to a predetermined desired size). For example, the fiberglass mat/product 10 or fiberglass backing layer 40 may be cut to a predetermined size and used as is or in a variety of fiberglass products/apparatuses 1.

The fiberglass backing layer 40 may in some embodiments be approximately about 15.2 to about 25.3 grams per square foot (gsf) for dry fiberglass basis weight. In some embodiments the material make-up of the fiberglass backing layer 40 or portion of the fiberglass product 1, 10 may be approximately 56% adhesive gel and approximately 44% glass fiber (e.g. soda lime glass type). In some embodiments, the fiberglass backing layer 40 may be approximately 0.5" thick.

Referring particularly to FIG. 4, the fiberglass backing layer 40 comprises a plurality of individual fibers 42. In some embodiments the individual fibers 42 within the fiberglass backing layer 40 may each have an average fiber diameter of approximately 30 microns. A single of the individual fibers 42 may form part of a plurality of distinct fiber bundles 44. Each of the individual fibers 42 may, at one or more locations, be bundled with one or more other individual fibers 42 to thereby form fiber bundles 44. Each of the fiber bundles 44 may comprise from two to two thousand individual fibers 42. Each of the fiber bundles 44 have a diameter that corresponds to a circle most closely conforming thereto. In some embodiments, the fiberglass product 10 or fiberglass backing layer 40 may comprise a plurality of fiber bundles 44 (e.g. with the same or different fiber count). In some embodiments, the fiberglass product 10 or fiberglass backing layer 40 may include a plurality of fiber bundles and individual fibers. In some implementations of the product 1 (e.g. fiberglass mat 10) or fiberglass backing layer 40, there may be a majority of individual fibers and a minority of fiber bundles of about 3 to about 10 fibers. In the one embodiment shown, the fibers 42 of the fiberglass backing layer 40 may be in a substantially flat, uncurled (e.g. non-sinusoidal) mat structure.

In some implementations, the fiberglass backing layer 40 or fiberglass product may be impregnated with an adhesive gel 70. The fiberglass backing layer 40 may be impregnated with the gel or resin. The gel 70 may be uniformly impregnated in the Z-direction/dimension or direction of airflow. In some embodiments, the fiberglass backing layer 40 may be impregnated up to 56% weight (e.g. total maximum 30.3 grams/SF of gel.) of a variety of gels, if used. In some embodiments, the adhesive gel may be a gelled isopropyl triphenyl phosphate fluid (PIP 3:1). Other gels may be used and still be within the scope of the invention. For example, a variety of gels may be used that self-extinguish to flame exposure on fiberglass (e.g. isobutyl triphenyl phosphate ester, SANTICIZER 154, formulated self-extinguishing gelled silicone fluids, etc.). In use, the gel may slowly leak the fluid out of the gel over time. This process may be called syneresis, so that captured dry dirt may become wetted as more fresh dry dirt accumulates over the useful operating life of the filter mat or fiberglass product. The wetting of dirt may increase the total dirt holding capacity of the filter as opposed to a non-wicking adhesive such as pressure sensitive adhesive. It should be understood, that a non-wicking adhesive may be used in some embodiments. The syneresis or leaked fluid may also hold onto dirt during the sloughing test were a filter at the end of its life (e.g. filled with dirt) is vibrated in pulses to simulate actual operating conditions. In some embodiments, the product or fiberglass backing layer 40 with gel, if used, may be as low as about 0.05% by weight maximum of total dirt of the captured dirt to fall from the dirty filter.

Fiberglass Product or Multi-Layered Mat

As shown in the one implementation of the Figures, the fiberglass product or multi-layered mat 10 may be configured as an open mouth bag type or pocket-type filter apparatus 1. The one or more bag type filters 1 may be used in a variety of applications, such as but is not limited to an engine intake of diesel locomotive. The fiberglass product or mat 10 may include a variety of layers, including but not limited to the layers 20, 30, and/or 40. In the one embodiment shown, the fiberglass product or multi-layered mat 10 may include a first fiber curl layer 20 on an upstream or unfiltered air entry side of the fiberglass product 1, a fiberglass backing layer 40 on a downstream or filtered air exit side of the fiberglass product 1, and a second fiber curl layer 30 between the fiber curl layer 20 and the fiberglass backing layer 40. The first fiber curl layer 20 comprises an upstream or first skin layer 51 upstream of the center curl fiber layer 20a and a downstream or second skin layer 52 downstream of the center curl fiber layer 20a. The second fiber curl layer 30 comprises an upstream or first skin layer 81 upstream of the center curl fiber layer 30a and a downstream or second skin layer 82 downstream of the center curl fiber layer 30a. The mat 10 and its one or more layers (e.g. scrim, curl fiber layer, backing layer, skin, etc.) may be impregnated with the at least one adhesive gel 70 as described above.

The multi-layered mat 10 may provide increased filtration or capture efficiency in the direction of air flow. The first fiber curl layer may have larger uniform open spaces/voids (e.g. large scale) between first fibers than the second fibers of the second fiber curl layer. Further, the second fiber curl layer may include larger uniform open spaces/voids (e.g. fine scale) between the second fibers than the fibers of the downstream fiberglass backing layer. In some implementations, the percentage of individual fibers may increase in the direction of airflow as compared to the layers (e.g. 20, 30, and 40). Corresponding, the percentage of bundled fibers may decrease in the direction of airflow as compared to the layers (e.g. 20, 30, and 40). The first curl layer may also have a larger number of fibers per bundle than the downstream layers 20 and/or 40.

In some implementations, the one or more layers of the multi-layered mat 10 may be formed (e.g. together or separately) by discharging glass fibers from multiple offices of a furnace and wrapped circumferentially around a rotating drum. The furnace and/or orifices may move longitudinally back and forth along the rotating drum while the drum remains longitudinally stationary. Alternative, the furnace and orifices may remain stationary while the drum rotates and moves longitudinally back and forth with respect to the stationary furnace. Typically, the fiberglass backing layer or skins may be formed by using a constant speed in the back and forth directions while the fiber curl layer may use a variable speed. After a suitable or predetermined thickness of fibers has been created for the one or more layers, the mat (e.g. one or more layers) may be severed or removed from the drum, stretched or expanded (e.g. longitudinally and/or latitudinally), cut to predetermined size, and/or assembled (e.g. into multiple layers, stitched, opened/closed ends, framed, cartridge, etc.) into a fiberglass product 20, 30, 40, 10, 1 (e.g. pad, mat, replaceable pad, filter apparatus, etc.).

In some implementations, a scrim layer 11 may be included on the upstream outer and downstream inner opposite faces of the fiberglass multi-layered mat 10 or apparatus 1. As shown, the scrim layer 11, if used, may be a polypropylene net (e.g. square mesh) in some embodiments. In some embodiments, one or more longitudinally extending seams 12 (e.g. stitching), if used, may define at least a portion of a pocket member 13 having a closed end 10b downstream of the open end 10a of the bag filter. The fiberglass product 1 may include a header frame 2 adjacent the open end or mouth 10a of the multilayered-mat 10 or bag type filter apparatus 1.

Figure 7:
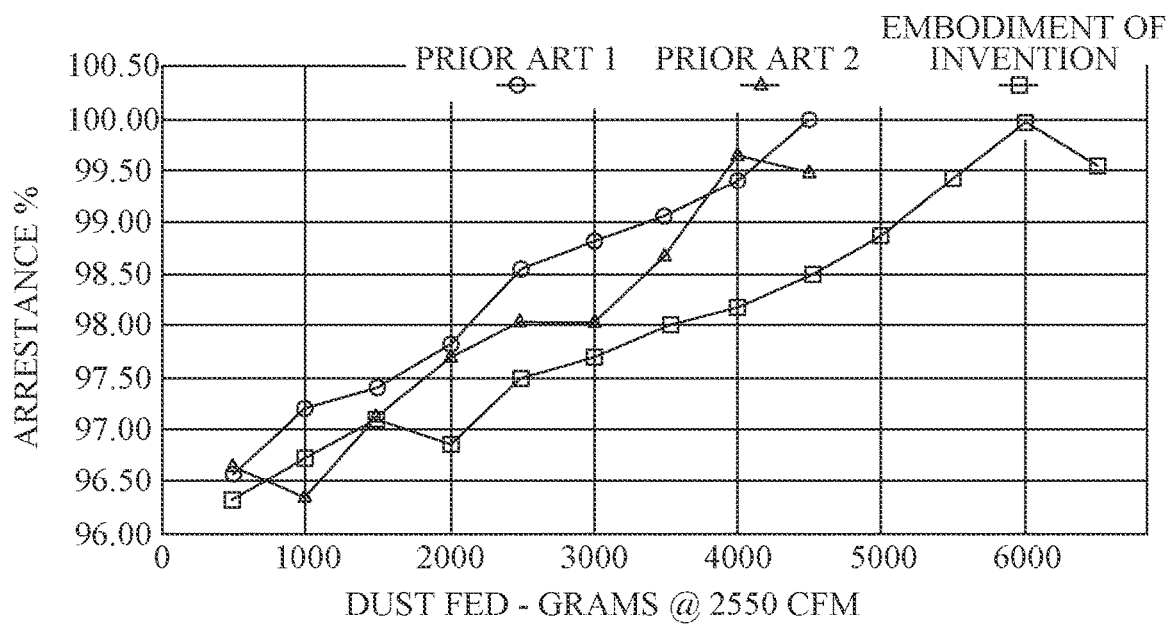
FIG. 7 discloses an AAR (American Association of Railroads) test performance comparison, charting the performance of the most efficient similar type prior art filter known against a comparable filter constructed in accordance with the embodiment as shown in FIG. 1, with the vertical axis indicating particulate arrestance percentages and the horizontal axis indicating quantity in grams of dust fed in incremental fashion.
Figure 8:
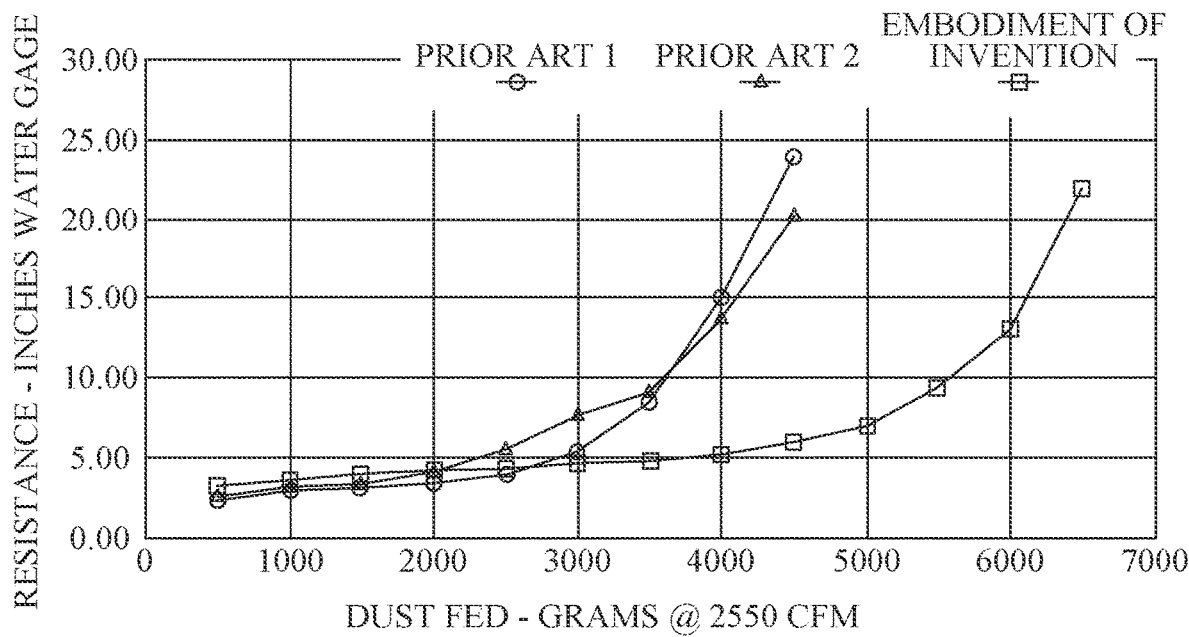
FIG. 8 discloses another AAR test performance comparison of the same filter units as in FIG. 7, only indicating resistance in water gauge against particulate quantity in grains of dust fed in incremental fashion.

Referring to FIGS. 7 and 8 of the drawings which disclose test performance characteristics conducted in accordance with AAR (American Association of Railroads) industry test procedures for testing pocket type filters of the type utilized as diesel locomotive air filters. As shown, the bag type filter apparatus 10 performs with higher efficiency both as to dust arrestance percentage and as to rate of resistance rise as dust is collected. These AAR tests leading to the performance test comparison characteristics as disclosed in the charts are known to one skilled in the filter arts and involve elaborate controlled test procedures described in an available AAR draft publication. The controlled AAR test parameters include, but are not limited to factors such as apparatus stabilization and mounting position, temperature, relative humidity, air flow, test dust and variable feeding rate control and specified test duct equipment in order to insure test comparison accuracy.

In a typical performance test procedure, after preconditioning, clean filter pressure drop is measured over an extended operating range of the tested filter element, preselectively 700 to 3500 cfm. The data is corrected to standard conditions, and is plotted to graphically show pressure drop as a function of air flow rate. A dust loading test is then conducted with the airflow being alternated hourly from 845 to 1695 to 2550 cfm while feeding Arizona Road, Fine Test Dust at a constant rate of 96 grams per hour. The dust passing through the tested filter element is collected by a downstream absolute filter and is changed each hour so that the incremental efficiency during each airflow segment can be determined. To allow for proper dust wicking, no more than six (6) one hour feeding segments are conducted in a 24-hour period. Dust feeding is continued until the pressure drop across a filter element at 2550 cfm reaches 20 inches of measured water gauge pressure drop. Dust capacity is defined as the total weight of dust fed to the filter multiplied by the dust weight arrestance at the 20 inches pressure drop. Pressure drop values are recorded at the beginning and end of each segment so that the pressure drop as a function of dust amount fed can be monitored and graphically reported.

Following dust loading an air volume cycling test is performed without feeding additional dust. During this test, the airflow through the filter is smoothly varied from 0 to 2550 to 0 cfm at a rate of 12 cycles per minute for 1000 cycles. The pressure drop across the element at 2550 cfm is monitored and the weight of the filter is taken after 0, 100, 200, 400, 600 and 1000 cycles so that the incremental and cumulative amount of dust sloughing of the filter can be determined.

From such tests as above described, the improved performance characteristics of the above described inventive apparatus when compared with filters of the prior art was determined as is shown in FIGS. 7 and 8. These improved performance characteristics have resulted in extended life filters with about 44% higher dirt holding capacity as shown in FIG. 8 for diesel engine intakes allowing for significant extension of the locomotive engine maintenance cycle time period, with the use of filter units of the embodiments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A fiberglass product comprising:
a first fiber curl layer on an upstream air entry side of the fiberglass product, the first fiber curl layer having a plurality of fiber curl first fibers and a constant first density;
a fiberglass backing layer on a downstream air exit side of the fiberglass product opposite the air entry side of the fiberglass product, wherein the fiberglass backing layer includes a plurality of third fibers and a constant third density; and
a second fiber curl layer between the first fiber curl layer and the fiberglass backing layer, wherein the second fiber curl layer includes a plurality of fiber curl second fibers and a constant second density, wherein the second density is larger than the first density, and wherein the third density is larger than the second density.

2. The fiberglass product of claim 1 is used in a bag type filter apparatus.

3. The fiberglass product of claim 1 wherein the plurality of first fibers include an amplitude from 0.25 inches up to 0.625 inches.

4. The fiberglass product of claim 1 wherein the plurality of first fibers include a curl length of 1.5 inches peak-to-peak.

5. The fiberglass product of claim 1 wherein the plurality of third fibers include a diameter of 22 to 40 microns.

6. The fiberglass product of claim 5 wherein the plurality of third fibers include the diameter of 28 to 32 microns.

7. The fiberglass product of claim 1 wherein the plurality of fiber curl second fibers include an amplitude from 0.25 inches up to 0.375 inches.

8. The fiberglass product of claim 1 wherein the plurality of fiber curl second fibers include a curl length of 0.5 inches to 0.75 inches peak-to-peak.

9. The fiberglass product of claim 1 wherein the plurality of fiber curl second fibers include a diameter of 22 to 40 microns.

10. The fiberglass product of claim 9 wherein the plurality of fiber curl second fibers include the diameter of 28 to 32 microns.

11. The fiberglass product of claim 1 wherein the first fiber curl layer, the second fiber curl layer, and the fiberglass backing layer are impregnated with an adhesive gel.

12. The fiberglass product of claim 11 wherein the first fiber curl layer is 55.4% by weight of the adhesive gel.

13. The fiberglass product of claim 11 wherein the second fiber curl layer is 57.4% by weight of the adhesive gel.

14. The fiberglass product of claim 11 wherein the fiberglass backing layer is 56% by weight of the adhesive gel.

15. The fiberglass product of claim 1 wherein at least one of the second fiber curl layer, the first fiber curl layer, and/or the fiberglass backing layer includes at least one skin layer on an upstream air entry side and/or a downstream air exit side thereof.

16. The fiberglass product of claim 1 wherein the first fiber curl layer and the second fiber curl layer each have a plurality of sinusoidal fiber bundles.

17. The fiberglass product of claim 16 wherein the plurality of sinusoidal fiber bundles of each one of the first fiber curl layer and the second fiber curl layer are a majority of the plurality of fiber curl first fibers and the plurality of fiber curl second fibers, respectively.

18. The fiberglass product of claim 1 wherein the plurality of third fibers of the fiberglass backing layer is a majority of individual fibers and a minority of a plurality of third fiber bundles.

19. The fiberglass product of claim 1 wherein a first compression strength of the first fiber curl layer is larger than a second compression strength of the second fiber curl layer.

* * * * *